US007874179B2

(12) United States Patent
Rue et al.

(10) Patent No.: US 7,874,179 B2
(45) Date of Patent: Jan. 25, 2011

(54) METHOD FOR REMOVAL OF GASEOUS INCLUSIONS FROM VISCOUS LIQUIDS

(75) Inventors: David M. Rue, Chicago, IL (US); Chun Choi, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 511 days.

(21) Appl. No.: 12/062,556

(22) Filed: Apr. 4, 2008

(65) Prior Publication Data
US 2009/0249834 A1 Oct. 8, 2009

(51) Int. Cl.
C03B 5/182 (2006.01)
C03B 5/225 (2006.01)
(52) U.S. Cl. .................... 65/134.9; 95/241; 95/252
(58) Field of Classification Search .......... 65/134.1, 65/134.9, 347; 95/241, 252
See application file for complete search history.

(56) References Cited
U.S. PATENT DOCUMENTS 3,244,496 A  4/1966  Apple et al.
3,261,677 A  7/1966  Plumat
3,516,799 A * 6/1970  Dotson ...................... 422/255
4,177,066 A * 12/1979 Clumpner ................... 75/585
4,406,683 A  9/1983  Demarest, Jr.

OTHER PUBLICATIONS

W. R. Russ et al., "Fluid Transfer Concentration of Airborne Radioxenon to Enhance Monitering Capabilities", Nuclear Instruments and Methods in Physical Research A 422 (1999) p. 820-825.*

* cited by examiner

Primary Examiner—Jason L Lazorcik
Assistant Examiner—Cynthia Szewczyk
(74) Attorney, Agent, or Firm—Mark E. Fejer

(57) ABSTRACT

A method for removal of gaseous inclusions from a viscous liquid in which a layer of filter particles is positioned in the viscous liquid and the viscous liquid is passed through the layer of filter particles, whereby the gaseous inclusions combine or coalesce within the layer of filter particles, forming larger gaseous inclusions which rise to the top of the viscous liquid and escape therefrom.

9 Claims, 3 Drawing Sheets

METHOD FOR REMOVAL OF GASEOUS INCLUSIONS FROM VISCOUS LIQUIDS

BACKGROUND OF THE INVENTION

1. Field of the Invention

This invention relates to a method for removing gaseous inclusions or bubbles from viscous liquids produced during the generation and/or processing of the viscous liquids. Exemplary of such viscous liquids is molten glass.

2. Description of Related Art

A number of commercially important materials are produced by processes involving viscous liquids in which gaseous inclusions or bubbles are generated in the viscous liquids during the production process. Quality specifications for the final product typically require the removal of gaseous inclusions over a certain size and may also require the removal of gaseous inclusions to a specified number per unit volume of end product. Typical of such materials is glass, which is produced in a high temperature process in which the raw batch materials used to produce the glass are melted to produce a highly viscous molten liquid. Because the gaseous inclusions cannot be removed from the solid end product, they must be removed while the precursor material is still in the viscous liquid state.

Under normal gravity, a gaseous inclusion will rise to the surface of a liquid. This is a consequence of the lower density of an insoluble gas. Increasingly precise mathematical descriptions have been developed that describe this well known phenomenon in various liquids over a wide range of liquid viscosities, e.g. Stokes Law:

$$V \alpha d^2 \cdot g \cdot (\rho_l - \rho_g)/\mu$$

Stokes Law states that the velocity at which a bubble rises is proportional to the square of the bubble diameter, proportional to the force of gravity, proportional to the difference in density between the liquid and the gas, and inversely proportional to the viscosity of the liquid. Thus, gaseous inclusions in viscous liquids rise very slowly through the liquids to the surface where they escape from the liquids, and the speed at which the gaseous inclusions rise through viscous liquids increases as the viscosities of the liquids increase. However, providing sufficient time for the gaseous inclusion to evolve from the viscous liquids is often impractical or undesirable. For processes such as glass melting which are carried out at high temperatures, holding the molten glass at temperature until the gaseous inclusions evolve can result in substantial additional costs and limits the methods that are practical for removal of the inclusions.

Most methods for speeding the removal of bubbles from liquids, particularly viscous liquids, take advantage of Stokes Law. Proposed and implemented methods for bubble removal include 1) pulling a vacuum on the liquid to increase bubble diameter and bubble velocity; 2) spinning the liquid to increase the gravitational constant g and, thus, increase bubble velocity; 3) heating the viscous liquid with local heating by various means, such as electrodes, burners, microwaves and the like, to decrease the liquid viscosity which, in turn, leads to higher bubble velocity; 4) injecting additional bubbles by using bubblers, adding a "fining agent", or injecting a light gas such as helium into the viscous liquid, producing bubble coalescence which effectively increases bubble diameter and, thus, bubble velocity; 5) passing the liquid over a "shelf" to create a thin layer which reduces bubble removal time simply because bubbles have less distance to travel to reach the upper surface of the liquid; 6) using acoustic or ultrasonic energy to cause the bubbles to vibrate, or to coalesce, or to be pushed towards coalescence zones or the surface, thereby enhancing the removal of the bubbles from the viscous liquid; and 7) stirring the liquid by mechanically lifting the liquid from the bottom toward the surface or by heating to create convective currents to carry the bubbles toward the surface, thereby reducing the time required for the bubbles to rise to the surface.

U.S. Pat. No. 3,244,496 to Apple et al. teaches a glass fining method and apparatus for removal of bubbles from the molten glass in which a screen or perforated sheet of platinum is located below the glass surface as a means for providing bubble nucleation in the glass. Bubbles initiating on the screen adhere to the screen and grow to the point at which several bubbles join to form a larger bubble such that buoyancy causes it to neck down and break free, causing them to accelerate to the glass surface and break. U.S. Pat. No. 3,261,677 to Plumat teaches a method for enhancing the removal of bubbles from molten glass in which the molten glass is introduced into a refining chamber in which it is spread out in a wide and thin layer so as to prevent the formation of an appreciable temperature gradient. As a result, the glass remains exposed to the very hot atmosphere of the glass melting chamber with which the fining chamber is attached, thereby maintaining its highly fluid nature. This is said, in turn, to assist the easy rise and escape of the bubbles. U.S. Pat. No. 4,406,683 to Demarest, Jr. teaches a method and apparatus for removal of gas inclusions from a molten glass pool in which a gas-inclusion-permeable, refractory metallic or ceramic screen is inserted in the downstream flowing, upper portion of the pool to diminish the glass flow adjacent the surface by viscous drag forces while permitting gas inclusions to rise through the screen to the surface of the molten glass pool to dissipate into the atmosphere.

However, each of these methods has limits with respect to capital cost, energy cost, and practicality. Vacuum systems are costly to build and complex in terms of operation. Centrifuges can be complex and are impractical when working with high temperature liquids such as molten glass. Heating the viscous liquid to lower the viscosity, whether using burners, electrodes, or microwaves costs energy. The addition of new bubbles can lead to complexity, can add cost for the gas, and does not assure complete capture of the smallest bubbles that are the most difficult to remove. Thin film bubble removal is impractical because a large surface must be maintained without variations in temperature or flow rate and without excessive wear of the "shelf". Acoustic or ultrasonic approaches, although promising, suffer from difficulties in scaling to a size that will effectively work with the large volumes of liquids commonly processed on an industrial scale. And, finally, stirring methods are of limited utility and must be implemented with care to avoid the addition of new bubbles into the liquid.

SUMMARY OF THE INVENTION

It is one object of this invention to provide a method for removal of gas inclusions from a viscous liquid that overcomes the physical limitations, energy costs and complexities of known methods and systems.

This and other objects of this invention are addressed by a method for removal of gaseous inclusions from a viscous liquid comprising the gaseous inclusions in which a layer of filter particles is positioned in the viscous fluid and the viscous liquid is passed through the layer of filter particles, whereby the gaseous inclusions coalesce within the layer of filter particles, forming larger gaseous inclusions which rise to the top of the viscous liquid and escape therefrom. This method is particularly suitable for use in the removal of bubbles from molten glass at high temperatures, a harsh environment in which most conventional bubble removal approaches are impractical. Unlike the methods of conventional bubble removal approaches which rely upon Stokes Law, the method of this invention is based on Bernoulli's equation:

$$P + \tfrac{1}{2}V^2 + gh = \text{Constant}$$

Bubble removal from molten glass is difficult because the melt is thermally and chemically aggressive and because the viscosity of the working melt is high. Only certain ceramic refractories, such as zirconia and alumina, and refractory metals, such as platinum, that have high temperature integrity, corrosion resistance, and resistance to oxygen reactions can survive in molten glass. These limitations suggest the need for melting and refining approaches that minimize complexity, moving parts, and contact with the melt because glass is processed in high volumes of about 1 to 25 tons per hour on a continuous basis. Because any modifications or repairs of equipment are costly, strong emphasis is given to reliable, easily-controlled processes. The high viscosity of molten glasses, ranging from about 50 to about 10,000 poise under melting and working conditions, is strongly related to temperature. Molten glass does not melt at a single temperature but over a narrow to wide range of several hundred degrees. Precise control of glass temperature and viscosity requires appropriate equipment, proper controls, and energy consumption. A high precision is needed because the formation of many glass products is highly dependent upon the viscosity of the glass entering the forming process stage. Any bubble removal method that alters the glass temperature uniformity or changes the working glass temperature adds undesirable cost and complexity to the glass making process.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY

Preferred Embodiments

As used herein, the term "viscous liquid" refers to a liquid having a viscosity of at least about 50 poise.

As used herein, the term "bubble-free viscous liquid" refers to a viscous liquid processed in accordance with the method of this invention in which the number and size of bubbles contained therein satisfies the criteria of the application in which the liquid is to be used. A zero number of bubbles in the viscous liquid is not a requirement for being bubble-free.

When confronted with the issue of gaseous inclusions removal from a viscous liquid, particularly one at high temperature, a determination must first be made of the condition of the liquid relative to the final liquid requirements. In practice, gaseous inclusions cover a broad range of quantities and sizes. As previously indicated, the time needed for a bubble to rise to the surface of a viscous liquid as described by Stokes Law is proportional to the square of the bubble diameter and inversely proportional to the viscosity of the liquid. Bubbles larger than several millimeters in a diameter will rise to the surface of a 100 to 1,000 poise liquid quickly enough such that residence time in a fining chamber alone is sufficient and practical for removal. However, bubble sizes typically extend down to the micron size and product requirements for optical materials such as glass typically specify maximum bubbles in the product glass of 100 microns or smaller. For bubbles in the micron size range, residence time alone is insufficient for clarifying many glasses to the required level of clarity.

The method and apparatus of this invention provide a means for removing gaseous inclusions from any viscous liquid and involves the use of one or two clarification stages, a coarse clarification stage and a fine clarification stage, depending upon the range of sizes of bubbles in the viscous liquid. The coarse clarification stage is required when the viscous liquid contains a large amount of bubbles and when the bubbles are large enough, typically greater than about 5 mm, so as to interfere with the removal of the smaller bubbles which are the target of this invention. For those viscous liquids containing bubbles less than about 5 mm in size, only the fine clarification stage is required.

Figure 1:
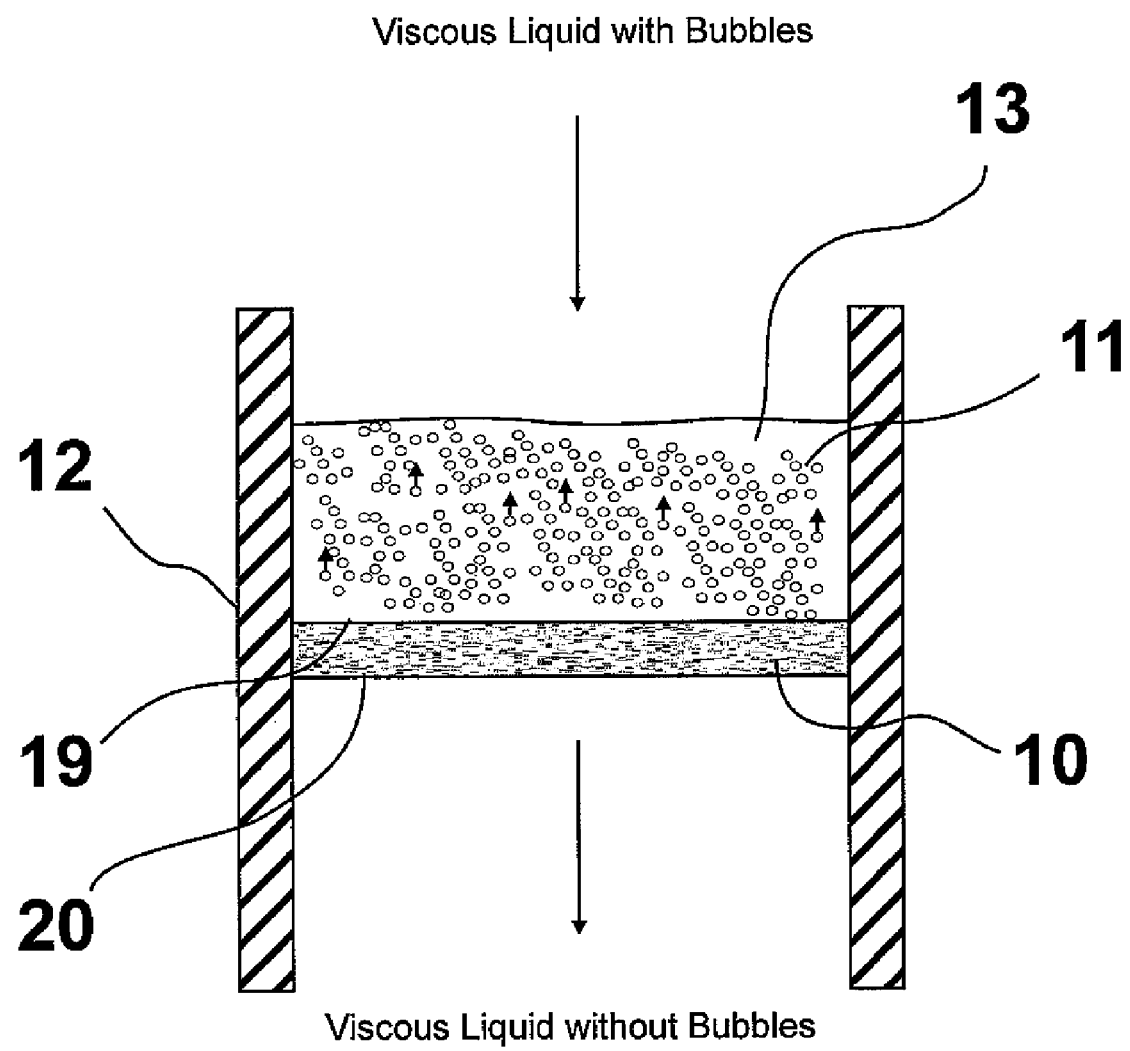
FIG. 1 is a schematic diagram of an apparatus for removal of gaseous inclusions from a viscous liquid showing the disposition of a filter particle layer within the viscous liquid in accordance with one embodiment of this invention.

The fine clarification process for removal of fine bubbles from a viscous liquid in accordance with one embodiment of this invention comprises passing of the bubble-laden viscous liquid 13 disposed within a fining chamber 12 in a downward direction through a layer of fine particles 10 disposed between screens 19 and 20 within the viscous liquid, resulting in the evolution of bubbles 11 from the viscous liquid 13 as shown in FIG. 1. It will be appreciated that only screen 20 is needed to maintain the layer of fine particles 10 in place. The effectiveness of this method relies upon two mechanisms. First, the viscous liquid is drawn in a downward direction slowly through the fine particle bed so that spaces between the particles screen out the bubbles and prevent them from continuing downward with the viscous liquid. However, this mechanism alone is insufficient for removing all of the bubbles because any bubble small enough to pass through the particle interstices will remain with the liquid. The second mechanism involves the attachment of the bubbles to the surfaces of the fine particles in the filter. However, the attachment is a relatively weak attachment, thus requiring that the velocity of the viscous liquid through the filter particle layer be low enough so as not to strip the fine bubbles from the surfaces of the filter particles. As an effective means of holding the filter particles in place, screens may be placed above, below, or within the filter particle layer.

Several factors control the effectiveness of the fine clarification stage. First, the particles of the filter particle layer must be sufficiently small so as to provide enough interstices for effective filtration and high contact of the bubbles with the particle surfaces. Second, the filter particle layer must be sufficiently thick so as to provide sufficient bubble-particle contact for complete capture of the bubbles on the particle surfaces. Third, the velocity of the viscous liquid, which is related to the head pressure of the viscous liquid, must be slow enough to prevent the liquid from stripping the loosely attached bubbles off of the particle surfaces. Fourth, the fine particle layer must be appropriately designed for the chemistry of the liquid, the temperature of the liquid, the viscosity of the liquid and the size of the bubbles.

Figure 2:
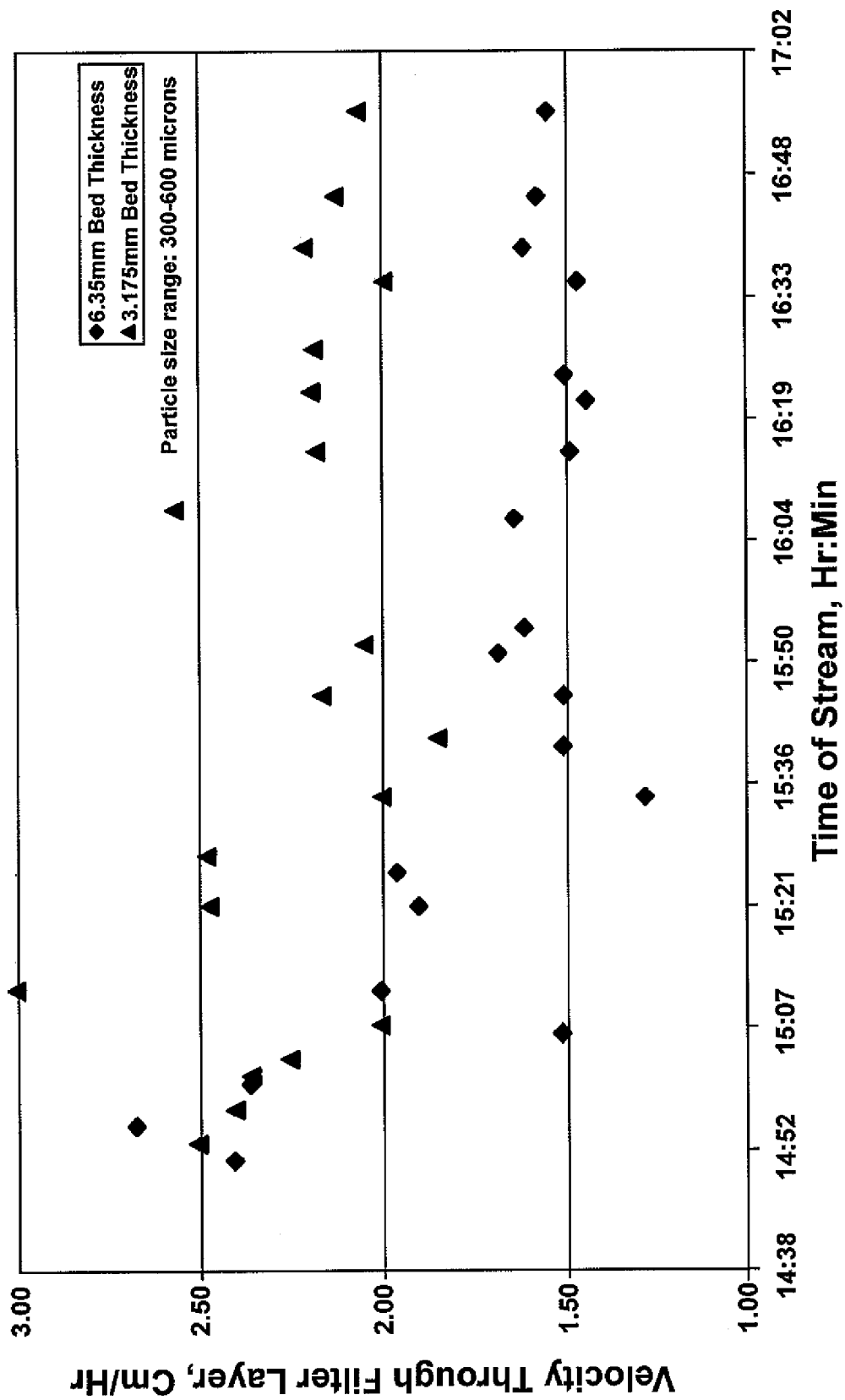
FIG. 2 is a diagram showing the impact of filter particle layer thickness on bubble removal from a viscous liquid.

Study of the fine clarification stage has shown that complete removal of gaseous inclusions to sub-micron levels can be achieved by about a 0.3 to about 1.2 centimeter thick layer of fine particles having particle diameters in a range of about 0.1 to about 1.0 mm. FIG. 2 shows the results of fine clarification of a 125 poise silicon oil using 0.3 and 0.6 mm layers of 300 to 600 μm diameter particles. In this test, the head of liquid above the filter layer was 19 cm. During the test, liquid was added as needed to maintain a steady liquid level above the filter bed. Results showed a liquid velocity of about 2.1 cm/hr through the 0.3 cm filter layer and about 1.6 cm/hr through the 0.6 cm filter layer. However, the liquid passing through the thinner layer still had some fine bubbles present while the liquid passing through the thicker filter layer was bubble-free. The 125 poise liquid is similar to the viscosity of molten glass (100 to 1,000 poise in most melters), but the performance of the fine clarification stage can be expected to be different under the high temperature operating conditions of a glass melter.

Based on the study results, the velocity of the viscous liquid through the layer of filter particles is preferably in the range of about 0.5 to about 5.0 cm/hr. Although higher velocities may be possible, higher velocities generally are expected to produce sufficient force to prevent the loose attachment of the bubbles to the filter particle surfaces and potentially to force the attached bubbles deep into the filtering layer, thereby obviating the advantages of the fine clarification stage to generate a bubble-free viscous liquid. However, for large scale industrial applications involving large quantities of viscous liquids, such as glass melting, these velocities are probably too low to achieve the desired bubble removal in a single fine clarification stage.

Accordingly, in accordance with one embodiment of this invention, for large scale industrial applications, both a coarse clarification stage and a fine clarification stage are employed for removing bubbles from a viscous liquid. The use of two clarification stages satisfies the practical requirement of scalability to industrial production levels without moving parts or complex, maintenance-intensive components. Velocities are low enough that excessive wear is avoided so that component lifetimes in operation are reasonable. To operate with high temperature liquids, such as molten glass, components, including the fine particles of the filter layer, must be composed of acceptable materials. Such materials are preferably selected from the group consisting of high temperature refractory materials, refractory metals (such as platinum), and refractory material coated with a thin layer of refractory metal.

An important feature of the fine clarification stage is the ultimate treatment of the bubbles that are retained in the filter particle layer. Without a means for removing the bubbles from the filter particle layer, a steady process useable by industry is not possible. As the bubbles attach to the filter particle layer particles, other bubbles will come in contact with the retained bubbles. These bubbles will either combine to form larger bubbles or will form a group of coalesced bubbles that will act like a larger bubble. When the combined and coalesced bubbles reach a sufficient size and surface area, they will rise vertically through the filter particle layer and through the downward moving viscous liquid until they reach the surface of the viscous liquid and break. This dynamic process involving a downward flow of the viscous liquid, retention of bubbles within the filter particle layer, and rising of combined and coalesced bubble must be active for the fine clarification stage to work. This dynamic process, which is a function of the parameters of the system (liquid properties, bubble size, and number, filter particle properties, and filter layer thickness) must be maintained during operation of the fine clarification stage of gaseous inclusion removal.

Certain viscous liquids such as molten silicates and glasses change viscosity with temperature. An important consideration in both the coarse and fine clarification stages is maintenance of the viscous liquid at a viscosity that is amenable to bubble removal. This is readily achieved during the coarse clarification stage by using burners to add heat as needed to the liquid to maintain the liquid temperature constant. Maintenance of a constant temperature and viscosity of the liquid, particularly high temperature liquids, during the fine clarification stage requires precise introduction of heat during the fine clarification process. This may be achieved in several ways. One approach is to heat the side walls of the fine clarification chamber so that the liquid temperature is held constant as the liquid travels downward. A second approach is to heat the filter particle layer directly or heat the screens above, below and/or within the filter particle layer directly to maintain constant temperature as the liquid moves downward. For this purpose, any reliable means for maintaining constant temperature and viscosity of the viscous liquid during coarse clarification and fine clarification may be applied.

In those instances, such as glass melting and refining, in which a coarse clarification stage is employed, in accordance with one embodiment of this invention, molten glass is discharged directly from a melter into a refractory channel, the size of which is dependent upon the production rate of the melter. Using roof-mounted or side-wall mounted burners for supplying heat, the objectives are to maintain temperature at a constant value and to establish a residence time for the molten glass within the refractory channel of about 20-30 minutes. Melt depth in the refractory channel is preferably in a range of about 10 cm to about 20 cm. For a 6 ton per hour glass melter typically employed in fiberglass production, a 4 meter channel with a 20 centimeter depth and a 30 centimeter width would provide about 20 minutes of residence time for coarse clarification.

After removal of the large bubbles, the viscous liquid, maintained at constant temperature, is then passed into the fine clarification stage. As previously described, velocity of the viscous liquid passing through the filter particle layer must be sufficiently low to allow for removal of all gaseous inclusions by the rise of the combined and coalesced bubbles through the liquid above the filter particle layer. A maximum practical velocity of 4 cm/h through the filter particle layer can meet the dynamic process requirements, although velocities above 4 cm/h are possible. At this liquid velocity, one filter particle layer would be insufficient to process 6 tons of molten glass per hour.

Figure 3:
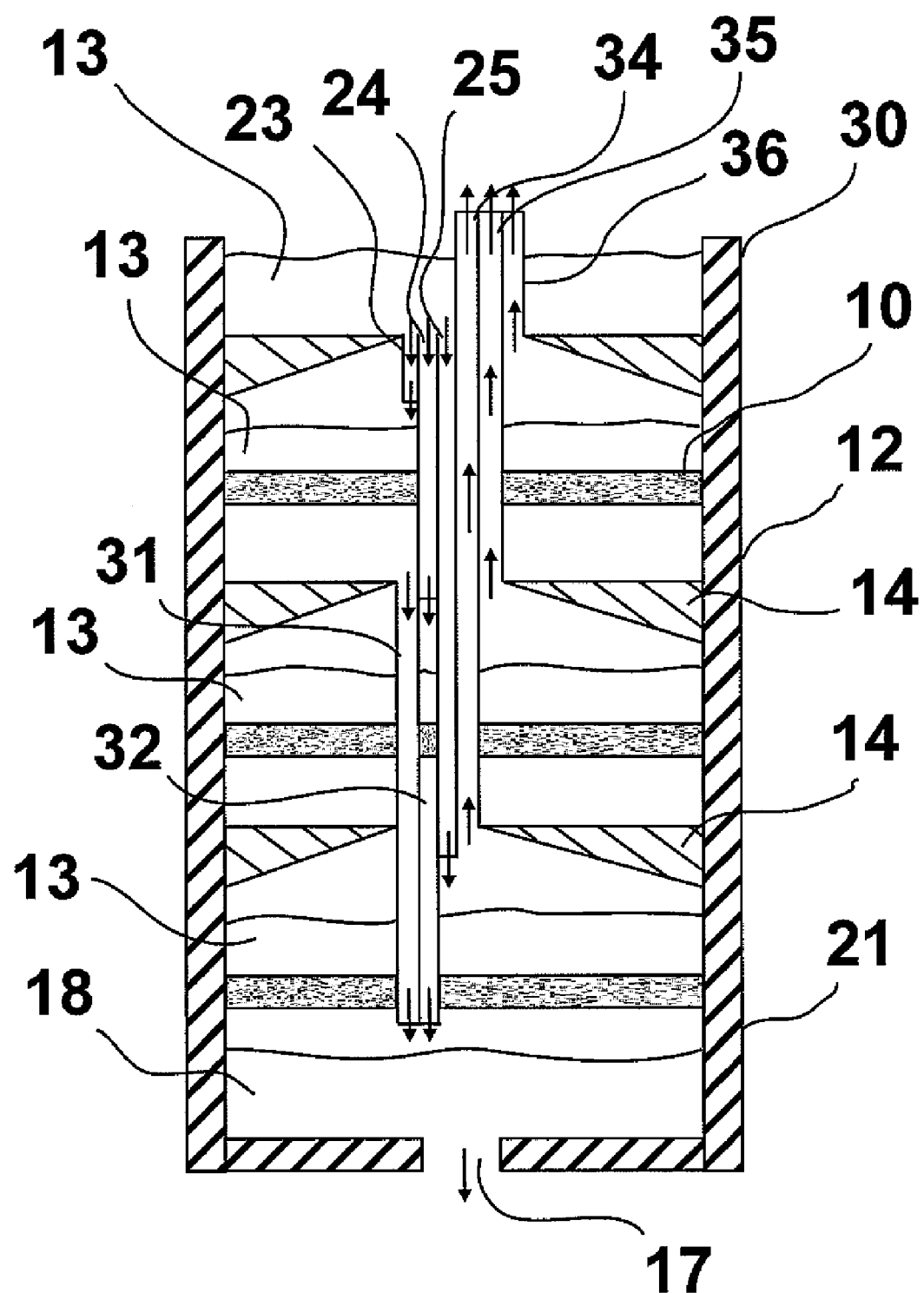
FIG. 3 is a schematic diagram of a multi-filter layer system for removal of gaseous inclusions from a viscous liquid in accordance with one embodiment of this invention.

FIG. 3 shows one possible configuration of a multi-layer filter particle apparatus for fine clarification having stacks of several filter particle layers inside a refractory chamber to retain heat and hold temperature constant while allowing segregated bubbles the opportunity to rise to the liquid surface and break. As shown, the apparatus comprises a fining chamber 12 having a bubble-laden viscous liquid end 30 and a bubble-free viscous liquid end 21 forming a bubble-free viscous liquid outlet opening 17 and containing a plurality of horizontally oriented filter particle layers 10 with a layer of bubble-laden viscous liquid 13 disposed above each filter particle layer. Bubble-laden viscous liquid 13 is provided to each filter particle layer 10 by means of a plurality of viscous liquid channels 23, 24, 25, each of which delivers bubble-laden viscous liquid to one of the filter particle layers. After passing through the filter particle layers, the bubble-free viscous liquid 18, communicated by means of bubble-free viscous liquid channels 31, 32 from the upper portions of the apparatus to the bubble-free viscous liquid end 21, is collected and expelled through bubble-free viscous liquid outlet opening 17. Bubbles evolved from the bubble-laden viscous liquid form a gas which is guided by means of baffles 14 disposed within the fining chamber into conduits 34, 35 and 36 through which the gas is exhausted from the fining chamber. It will be appreciated that this apparatus involves no moving parts. Calculations show that for a production rate of 6 tons/hr of molten glass with a velocity less than 4 cm/h, a refractory cylinder with a 2.65 (8.7 foot) inside diameter that contains 10 filter layers and has an inside height of 2.3 meters (7.5 feet) is sufficient to house the fine clarification stage. The thickness of the filter particle layers is preferably in the range of about 0.6 to about 1.0 centimeters with particle sizes in the range of about 200 to about 800 microns in diameter.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method for removal of gaseous inclusions from molten glass comprising said gaseous inclusions, the method comprising the steps of:
    positioning a layer of filter particles in said molten glass;
    passing said molten glass in a downward direction through said layer of filter particles, whereby said gaseous inclusions combine or coalesce within said layer of filter particles, forming larger gaseous inclusions which rise to a top of said molten glass and escape therefrom.

2. The method of claim 1 further comprising positioning at least one wire mesh screen one of horizontally above, horizontally within, and horizontally below said layer of filter particles.

3. The method of claim 2, wherein said filter particles have a diameter in a range of about 100 μm to about 1000 μm.

4. The method of claim 1, wherein said layer of filter particles has a thickness in a range of about 3 mm to about 20 mm.

5. The method of claim 1, wherein a velocity of said molten glass passing through said layer of filter particles is in a range of about 0.5 cm/h to about 10 cm/h.

6. The method of claim 1, wherein said molten glass is introduced into a refractory channel sized to provide a residence time for said molten glass in said refractory channel in a range of about 20 to about 30 minutes prior to passing said molten glass through said layer of filter particles.

7. The method of claim 6, wherein said molten glass is passed through at least one wire mesh screen disposed within said refractory channel.

8. The method of claim 1, wherein said filter particles are made of a refractory material.

9. The method of claim 8, wherein said filter particles are coated with a refractory metal.

* * * * *